United States Patent Office 3,394,149
Patented July 23, 1968

3,394,149
STABILIZED ALPHA-SUBSTITUTED BETA-LACTONE COMPOSITIONS
Arie Klootwijk, Amsterdam, Netherlands, assignor to Shell Oil Company, New York, N.Y., a corporation of Delaware
No Drawing. Filed Mar. 4, 1966, Ser. No. 531,761
Claims priority, application Netherlands, Sept. 15, 1965, 6511987
6 Claims. (Cl. 260—343.9)

ABSTRACT OF THE DISCLOSURE

Stabilized α-substituted β-lactone compositions, obtained by intimately contacting a β-lactone of from 1 to 2 alpha alkyl substituents and an aromatic sulfonic acid.

This invention relates to an improved method of stabilizing α-substituted β-lactones and to the stabilized compositions thereby obtained.

The α-substituted β-lactones are of interest as precursors of polymeric materials useful in the production of synthetic fibers. Such polymeric polyesters, when of high molecular weight, have been found to possess many interesting and desirable properties. The lactone monomers, however, are unstable and tend to polymerize during storage and transport, particularly at elevated temperatures, to form less desirable polymers of low molecular weight, thereby rendering more difficult the subsequent production of high molecular weight polymer. It would therefore be of advantage to provide a method for enhancing the stability of the lactone monomer and retarding premature polymerization. The U.S. Patent No. 3,117,980 issued Jan. 14, 1964, to Martin, discloses a method of stabilizing β-lactones by adding thereto certain nitrated phenols, e.g., picric acid. Such a procedure is not entirely satisfactory due to the known tendency of such phenols to decompose, which decomposition would lead to discoloration of the lactone monomer as well as polymers produced therefrom.

It is an object of the present invention to provide an improved method of stabilizing α-substituted β-lactones and the stabilized compositions thereby produced. More particularly, it is an object to provide stabilized compositions comprising a β-lactone substituted on the alpha carbon atom thereof with from 1 to 2 alkyl substituents, as well as to provide the method of affording stabilization.

It has now been found that these objects are accomplished by the process of intimately contacting an α-substituted β-lactone with a minor amount of an aromatic sulfonic acid. The resulting lactone compositions are characterized by an increased stability at temperatures at or higher than those likely to be encountered during storage and transport as manifested by a greatly reduced tendency toward autopolymerization.

The α-substituted β-lactone which comprises the major component of the compositions of the invention is a β-lactone of at least one substituent other than hydrogen on the carbon atom alpha to the carboxy moiety. One class of such lactones comprises those lactones of from 4 to 10 carbon atoms represented by the formula

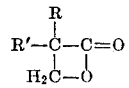

wherein R is alkyl of up to 7 carbon atoms and R' is hydrogen or R. Illustrative of such lactones are α-methyl-β-propiolactone, α-ethyl-β-propiolactone, α-butyl-β-propiolactone, α,α-dimethyl-β-propiolactone, α-methyl-α-ethyl-β-propiolactone, α-ethyl-α-tert-butyl-β-propiolactone and α-methyl-α-hexyl-β-propiolactone. In general, preferred lactones of the above formula are those wherein both R and R' are alkyl and particularly satisfactory are compositions wherein the lactone component is α,α-dimethyl-β-propiolactone.

The above-described α-substituted β-lactones are stabilized by intimately contacting the lactone with a minor proportion of an organic aromatic sulfonic acid, that is, an aromatic compound wherein at least one sulfo moiety, i.e., at least one —$SO_3H$ moiety, is attached directly to a carbon atom which is a member of a six-membered carbocyclic aromatic ring. The aromatic sulfonic acid is a sulfonic acid of from 6 to 20 carbon atoms, is a monosulfonic acid or a poly-sulfonic acid incorporating more than one sulfo moiety, and is an otherwise hydrocarbon sulfonic acid or is substituted with non-hydrocarbyl substituents such as alkoxy, amino, nitro or halo. A preferred class of sulfonic acid stabilizers comprises mono- to dinuclear aromatic sulfonic acids of from 6 to 12 carbon atoms and of from 1 to 2 sulfo moieties which are free from non-aromatic carbon-carbon unsaturation. These preferred sulfonic acids are hydrocarbon sulfonic acids, that is, contain only atoms of carbons and hydrogen besides the sulfur and oxygen atoms of the sulfo moiety (moieties) or are non-hydrocarbyl-substituted sulfonic acids additionally incorporating from one to three non-hydrocarbyl ring substituents which are amino or halo wherein any halo substituents are preferably halo cf atomic number from 17 to 35 inclusive, i.e., chloro or bromo. Illustrative of such preferred sulfonic acids are benzenesulfonic acid, p-toluenesulfonic acid, p-chlorobenzenesulfonic acid, 2,4-dimethylbenzenesulfonic acid, p-tert - butylbenzenesulfonic acid, m - propylbenzenesulfonic acid, m - bromobenzenesulfonic acid, naphthalene-1 - sulfonic acid, naphthalene - 2 - sulfonic acid, 4 - ethylnaphthalene - 1 - sulfonic acid, 5 - aminonaphthalene - 1-sulfonic acid, 6 - chloronaphthalene - 2 - sulfonic acid, p-benzenedisulfonic acid, naphthalene - 1,4 - disulfonic acid, 4 - ethylnaphthalene - 1,5 - disulfonic acid and 6-chloronaphthalene-1,4-sulfonic acid.

Particularly preferred are hydrocarbon mono- to dinuclear monosulfonic acids of up to 2 ring substituents, which substituents are alkyl of up to 4 carbon atoms. An especially suitable stabilizer comprises a benzenesulfonic acid of from 0 to 1 alkyl substituents wherein any alkyl substituent is alkyl of up to 4 carbon atoms, e.g., benzenesulfonic acid and p-toluenesulfonic acid.

The stabilizer is employed in a relatively minor amount. Effective stabilization is obtained when the amount of stabilizer employed in the lactone-containing composition is from about 0.005% mole to about 10% mole based on the total amount of composition. Amounts of stabilizer from about 0.05% mole to about 3% mole on the same basis are preferred.

The stabilized compositions are prepared by intimately contacting the lactone with the sulfonic acid stabilizer, thereby obtaining an essentially homogeneous mixture. The precise method of obtaining intimate contact is not critical and methods such as dissolving, shaking, stirring and the like are suitable.

As previously stated the process of the invention is useful in providing compositions comprising the α-substituted β-propiolactones which exhibit enhanced storage and thermal stability as shown by a reduced tendency toward the autopolymerization generally exhibited by such unstabilized lactones. The stabilized compositions are polymerizable by known catalytic methods to high molecular weight polymers without appreciable detriment arising from the presence of the stabilizer although, if desired, the stabilizer is separated from the lactone monomer by conventional methods, e.g., flash distillation or selective extraction, prior to polymerization. The stabilized lactone compositions are particularly useful in providing precursors of high molecular weight polymers due to the relatively low amount of low molecular weight polymer formed during the storage and handling of the lactone monomer prior to polymerization.

To more fully illustrate the improved process of the invention and the stabilized compositions thereby obtained, the following examples are provided. It should be understood that the details thereof are not to be regarded as limitations as they may be varied as will be understood by one skilled in this art.

Example I

A quantity of α,α-dimethyl-β-propiolactone was prepared by reacting bromopivalic acid with an equivalent amount of sodium hydroxide at room temperature in an aqueous medium while extracting the aqueous solution with chloroform. The α,α-dimethyl-β-propiolactone product was subsequently isolated from the chloroform solution by removing the chloroform by distillation. The lactone was then purified to less than 0.0001% wt. of impurities detectable by gas-liquid chromatographic analysis.

A series of compositions was prepared by adding to samples of the purified α,α-dimethyl-β-propiolactone controlled amounts of various aromatic sulfonic acids. The stability of each resulting composition was determined by maintaining the composition at 80° C. and determining the time required for the formation of 0.1% wt. of polymer. The results of these determinations are shown in Table I wherein, for purposes of comparison, the stability of the purified lactone at that temperature is also shown.

It should be appreciated that the temperature employed for the comparison is somewhat higher than those likely to be encountered in commercial storage and transport of the α-substituted β-lactones. However, this temperature is not in any way critical and the stability imparted by the stabilizers at lower temperatures, i.e., those more likely to be encountered in normal storage and transport of the lactone monomers, will be even greater.

Table I

| Added stabilizer, percent mole in composition: | Storage time, hrs. |
|---|---|
| None | 0.5 |
| Naphthalene-2-sulfonic acid, 0.2 | 7.5 |
| 5-aminonaphthalene-1-sulfonic acid, 0.2 | 9 |
| Benzenesulfonic acid, 0.2 | 14 |
| p-toluenesulfonic acid, 0.2 | 21 |

Example II

When a composition is prepared consisting essentially of α-methyl-α-ethyl-β-propiolactone and approximately 0.7% mole of p-ethylbenzenesulfonic acid, the composition will exhibit a lesser tendency toward autopolymerization than does the non-stabilized lactone.

I claim as my invention:

1. A composition consisting essentially of (a) an α-substituted β-lactone of from 4 to 10 carbon atoms of the formula

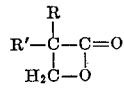

wherein R is an alkyl and R' is hydrogen or alkyl and (b) from about 0.005% mole to about 10% mole based on the total composition of an otherwise hydrocarbon sulfonic acid free from non-aromatic carbon-carbon unsaturation selected from benzene sulfonic acids and naphthalene sulfonic acids of from 6 to 20 carbon atoms, of from 1 to 2 sulfonic acid moieties and up to three non-hydrocarbyl aromatic ring substituents selected from amino and halo of atomic number from 17 to 35 inclusive.

2. The composition of claim 1 wherein the R' substituent of the lactone is alkyl.

3. The composition of claim 1 wherein the lactone is α,α-dimethyl-β-propiolactone.

4. The composition of claim 3 wherein the sulfonic acid is benzenesulfonic acid of from 0 to 1 alkyl substituents, any alkyl substituent being alkyl of up to 4 carbon atoms.

5. The composition of claim 4 wherein the sulfonic acid is benzenesulfonic acid.

6. The composition of claim 4 wherein the sulfonic acid is p-toluenesulfonic acid.

References Cited

UNITED STATES PATENTS 3,117,980   1/1964   Martin _____ 260—343

NICHOLAS S. RIZZO, Primary Examiner.

F. A. MIKA, Assistant Examiner.